United States Patent [19]

Inoue et al.

[11] Patent Number: 4,506,767
[45] Date of Patent: Mar. 26, 1985

[54] PAD CLIP FOR DISC BRAKE

[75] Inventors: Takehisa Inoue; Kazuhisa Kinoshita, both of Saitama, Japan

[73] Assignee: Akebono Brake Industry Co., Ltd., Tokyo, Japan

[21] Appl. No.: 585,016

[22] Filed: Mar. 2, 1984

Related U.S. Application Data

[63] Continuation of Ser. No. 487,594, Apr. 27, 1983, abandoned, which is a continuation of Ser. No. 218,120, Dec. 19, 1980, abandoned.

[30] Foreign Application Priority Data

Dec. 21, 1979 [JP] Japan .......................... 54-177276[U]

[51] Int. Cl.³ ........................................... F16D 55/224
[52] U.S. Cl. .................................................. 188/73.38
[58] Field of Search .............. 188/73.38, 73.37, 73.36, 188/205 A, 205 R, 250 F, 73.1

[56] References Cited

U.S. PATENT DOCUMENTS

| | | | |
|---|---|---|---|
| 4,134,477 | 1/1979 | Asquith | 188/73.38 |
| 4,162,721 | 7/1979 | Moriya | 188/73.38 |
| 4,180,148 | 1/1979 | Souma | 188/73.38 |
| 4,181,200 | 1/1980 | Souma | 188/73.38 |
| 4,214,649 | 7/1980 | Fujimori et al. | 188/73.38 |

FOREIGN PATENT DOCUMENTS

| | | | |
|---|---|---|---|
| 52101332 | 3/1979 | Japan | 188/73.36 |
| 2017237 | 10/1979 | United Kingdom | 188/73.38 |
| 2046855 | 11/1980 | United Kingdom | 188/73.36 |
| 2066911 | 7/1981 | United Kingdom | 188/73.38 |

Primary Examiner—Trygve M. Blix
Assistant Examiner—Edwin L. Swinehart
Attorney, Agent, or Firm—Toren, McGeady and Stanger

[57] ABSTRACT

A pad clip for a disc brake is arranged to have friction pads which are carried by a support pushed against a disc with the lug parts which are formed at the ends of the friction pads engaged with stepped parts of the support. The pad clip is provided with hook parts which are arranged to engage the lug parts of the friction pad and, during brake application, to restrict the movement of the friction pad on the braking face of the disc.

3 Claims, 9 Drawing Figures

IN THE DIRECTION OF ROTOR ROTATION

PAD CLIP FOR DISC BRAKE

This is a continuation of application Ser. No. 487,594, filed Apr. 27, 1983, which is a continuation of application Ser. No. 218,120, filed Dec. 19, 1980, both now abandoned.

BACKGROUND OF THE INVENTION

1. Field of the Invention

This invention relates to an improvement on a pad clip which grips a friction pad of a disc brake.

2. Description of the Prior Art

The friction pads of a disc brake are arranged to be pushed against a disc by an action of a pad thrusting mechanism or a caliper. A braking force of the disc brake is obtained on both sides by the disc pressed with the friction pads. Each friction pad is carried by a fixed carrying body such as a support which permits the friction pad to be movable in the axial direction of the disc.

There have been known various types of arrangement for carrying the friction pad with a support or the like. Such known types of arrangement include, for example, a type in which protrusions provided on the left and right sides of the friction pad are fitted into recesses provided in the support and another type in which lug parts protruding from the corners of the left and right ends of the friction pad are arranged to be engaged and hooked by stepped parts of the support.

Generally, in the friction pad carrying arrangement of these known types, there is provided a pad clip which is arranged to exert a spring force on the friction pad in the direction parallel with the rotating plane of the disc for the purpose of preventing the friction pad from rattling under a non-brake applying condition.

The accompanying drawings FIGS. 5(A) and (B) show the conventional pad clips 5 and 6 which are used for carrying such friction pads 2. Each of the pad clips 5 and 6 is disposed between the lug part 3 of the friction pad 2 and a protrusion 7 formed on the upper part of the stepped part 4 of the support 1 and is formed into a bent shape which is arranged to push the disc inward in the direction of its diameter. In the friction pad carrying arrangement of this type, the friction pad 2 is not directly engaged with the support 1 in a protrusion and recess fitting relation or in a like relation. Therefore, the friction pad 2 is allowed a relatively great latitude for movement in the outer axial direction of the disc. Besides, when the friction pad is pushed against the disc during brake application, the friction pad 2 receives a force to rotate it toward the outside of the disc diameter in the direction of an arrow A as shown in the drawing (in which the disc is illustrated as rotating from the right to the left). Therefore, the conventional pad clips 5 and 6 have been frequently subjected to elastic deformation. This is undesirable for the friction pad 2 in terms of fatigue thereof. Further, with the friction pad 2 allowed to move to a great extent, a shim 24 or 25 (see FIGS. 2 and 3) which is arranged to prevent rattling tends to be damaged. Thus, this problem has sometimes necessitated provision of some means for restricting the movement of the friction pad in the outer axial direction of the disc. This invention is directed to the solution of this problem.

SUMMARY OF THE INVENTION

It is therefore a general object of the invention to provide an improvement on the pad clip to be used for a friction pad carrying arrangement of the above stated type in which the lug parts protruding from the corners of the left and right ends of the friction pad are engaged and hooked by the stepped parts of the support.

In accordance with the present invention, in the disc brake wherein the lug parts formed to protrude from the corners of the left and right ends of the friction pad are arranged to be engaged and hooked by the stepped parts of the support and a pad clip is interposed in between each lug part of the friction pad and an upward protrusion of the stepped part of the support to exert a force to push the friction pad in the inward direction of the diameter of the disc, the disc brake is characterized by that: Each of the above stated pad clips is formed by a curved plate spring material. A hook part which is arranged to embrace the lug part and to have it hooked thereon the left or right side is provided at the fore end of one of the end portions of the pad clip.

The above and further object, features and advantages of the invention will become apparent from the following detailed description of embodiments thereof taken in connection with the accompanying drawings.

DETAILED DESCRIPTION OF PREFERRED EMBODIMENTS

Figure 2:
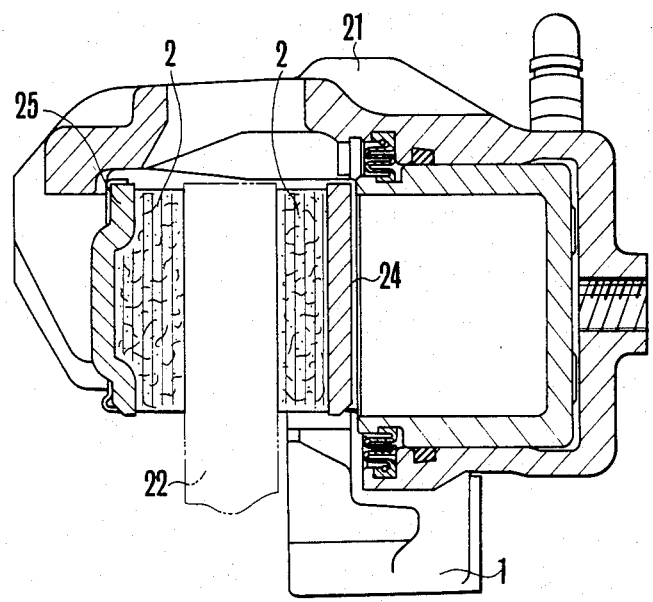
FIG. 2 is a sectional view taken on line II—II of FIG. 1.

Referring to the accompanying drawings, a support 1 which is secured to a structural part of a vehicle has a pair of guide pins 19 and 20 secured thereto. A caliper 21 is arranged to be movable in the axial direction of a disc 22 with boss parts 21a and 21b of the caliper 21 fitted and engaged with the guide pins 19 and 20. Between the guide pin 20 and the boss part 21b, there is provided an elastic sleeve 23. Referring to FIG. 2, a hydraulic action causes a piston 24 to bring a friction pad 2 on the right hand side into contact with the disc 22. Then, a reaction to this causes the caliper 21 to move to the right to bring another friction pad 2 on the left hand side into contact with the disc 22.

The friction pad 2 has a pair of lug parts projecting in the radial direction of the disc at its both ends in the circumferential direction of the disc. Each of these lug parts has an inner side face opposing to the inner side face of the other lug part.

Figure 1:
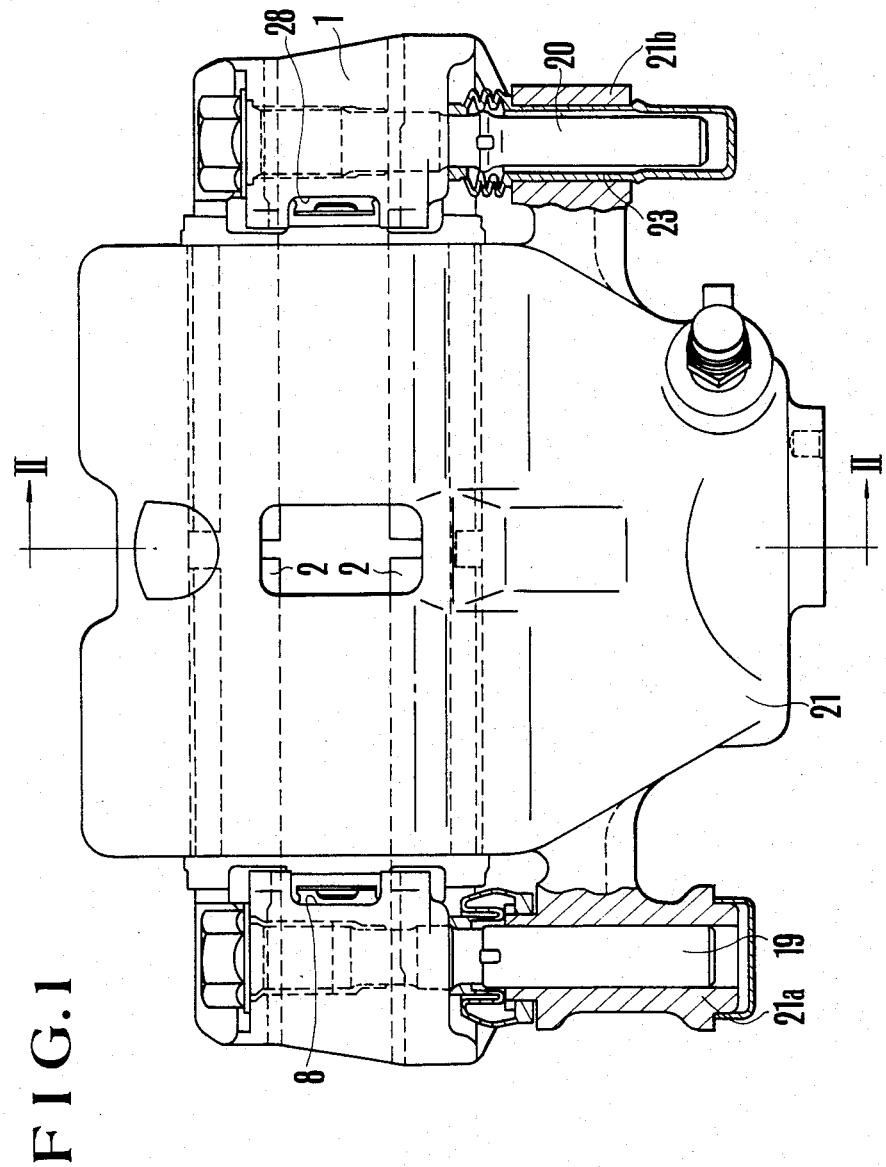
FIG. 1 is a plan view showing a disc brake using the pad clips of the present invention.
Figure 3:
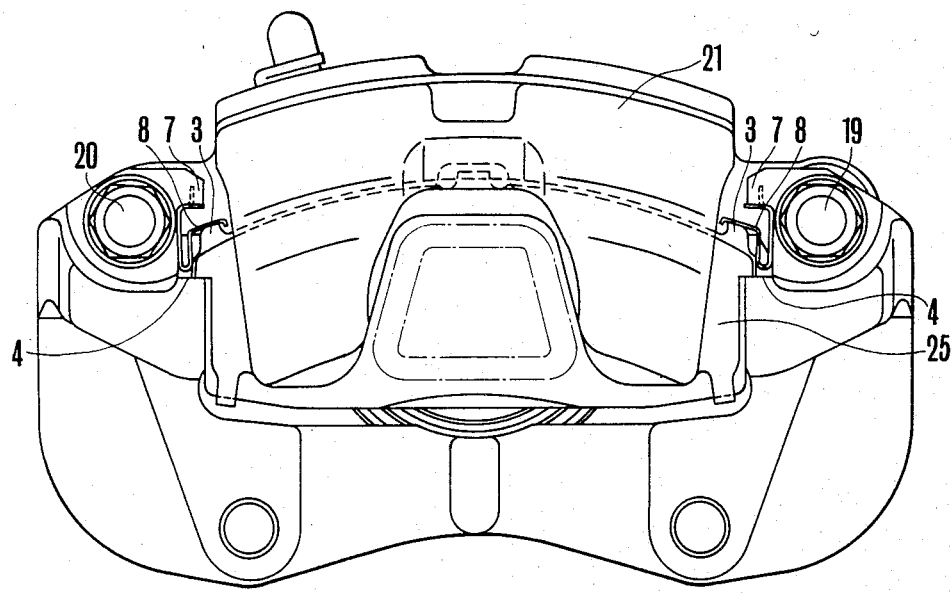
FIG. 3 is a left side view of the disc brake shown in FIG. 1.
Figure 4:
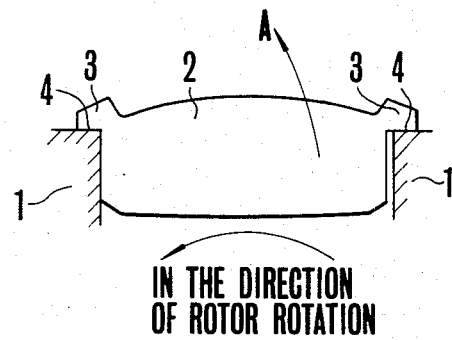
FIG. 4 is an illustration of the friction pad carrying arrangement to which the present invention is applied.
Figure 5A:
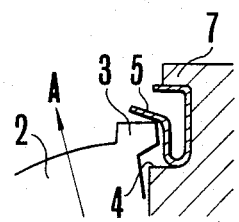
FIGS. 5(A) and 5(B) are illustrations showing the pad clip mounting condition as examples of the conventional arrangement.
Figure 5B:
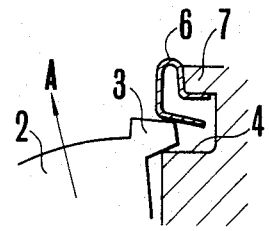

The problem of the conventional pad clip mentioned in the foregoing is solved by the invented improvement which is arranged for example as shown in FIGS. 1, 3 and 6(A). A pad clip 8 is made from a curved spring plate material. A hook part 10 is formed at one end of the pad clip 8 into a shape to embrace the lug part 3 of the friction pad 2. The lug part 3 has an inner side face and an outer side face spaced from each other in the circumferential direction of the disc and the hook part 10 of the lug part engages the inner side face. The friction pad 2 is pushed inward in the direction of the diameter of the disc by a force of the elastic deformation of the pad clip 8 which takes place between the above-stated one end of the pad clip 8 and the other end thereof. The rotation of the friction pad which takes place when the friction pad 2 is brought into contact with the disc is restricted by the engagement of the above stated hook part 10 of the pad clip 8 and the lug part 3 of the friction pad.

With the pad clip arranged in this manner, the friction pad 2 is hindered from rotating in the outward direction of the disc diameter not only by the force of the pad clip 8 exerted at one end thereof in the inward direction of the disc diameter but also by the hooked engagement of the hook part 10. This arrangement gives an advantage over the conventional pad clip arrangement in respect to durability. Meanwhile, the movement of the friction pad 2 also can be restricted by this arrangement to a great extent.

Figure 6A:
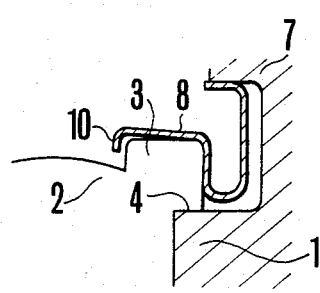
FIGS. 6(A) and 6(B) are illustrations of examples of arrangement for mounting the invented pad clip.
Figure 6B:
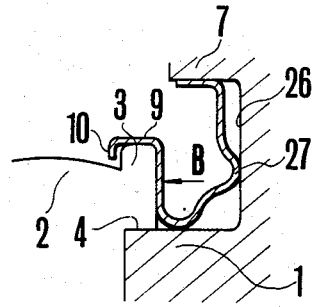

FIG. 6(B) shows another example of the invented pad clip which is a modification of the pad clip shown in FIG. 6(A). In this case, a pad clip 9 is provided with an arcuate part 27 which is arranged to engage a side edge part 26 of the support 1 in such a way as to exert a force to push the friction pad 2 in the circumferential direction of the disc as indicated by an arrow B. This arrangement more effectively prevents the friction pad 2 from rattling.

Figure 7:
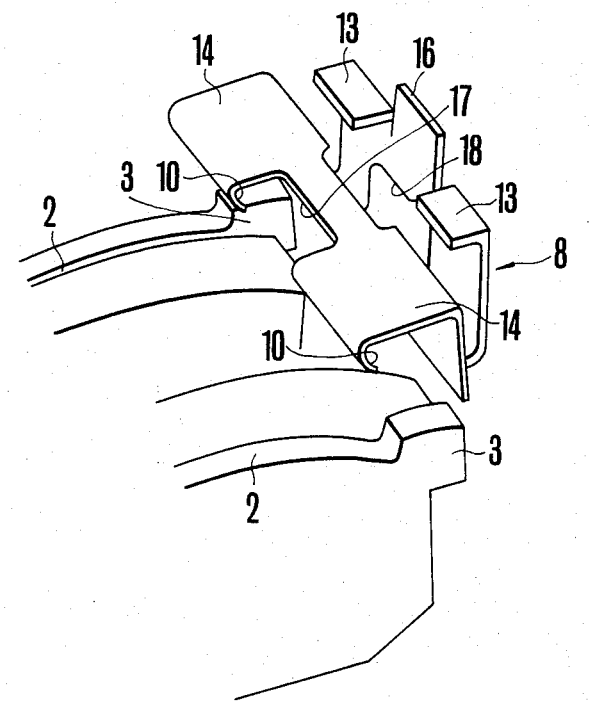
FIG. 7 is an oblique view showing the relation of a pad clip to a friction pad as an embodiment of the invention.

An example of the detailed arrangement of the pad clip which is as shown in FIGS. 1 to 3 and 6 and is arranged to act on a pair of friction pads 2 on both sides of the disc is as shown in FIG. 7. Referring to FIG. 7, the pad clip 8 is made of a bent plate spring material and is symmetrically formed to have the middle part of the symmetry located above the edge of the disc. A numeral 13 indicates end parts which are arranged to engage the lower faces of a protrusion 7 provided above the stepped part of the support 1; 14 indicates end parts which engage the upper faces of the lug parts 3 of the friction pad 2 extending between the inner side face and the outer side face. Each of the end parts 14 is arranged to push the corresponding lug part 3 inward in the direction of the diameter of the disc and is provided with a hook part 10 which is arranged at the fore end of the end part 14 to embrace the lug parts in a hooking manner. In the middle part in the longitudinal direction of the pad clip 8, there is provided a protrusion 16 which serves to prevent the pad clip 8 from slipping out of the position thereof. The pad clip 8 is also prevented from coming in contact with the periphery of the disc with cutaway parts 17 and 18 provided therein.

As described in the foregoing, despite the relatively simple arrangement thereof, compared with the conventional pad clip, the pad clip of the present invention is capable of restricting the movement of the friction pad in the outward direction of the disc diameter for improvement in the durability of the pad clip. The invention thus gives a great advantage in the practical applications thereof.

What is claimed is:

1. A disc brake comprising:
  a disc to be braked, said disc being rotatable about an axis;
  a stationary support having a stepped part extending in the axial direction of the disc;
  a pair of friction pads each located on an opposite side of the disc and relative to the axis of said disc having a radially inner side and a radially outer side, each friction pad has a pair of lug parts on the radially outer side thereof projecting generally in the radial direction of the disc outwardly from the disc axis with each said lug located at an opposite end of said friction pad in the circumferential direction of the disc, and each of the lug parts has a generally radially extending inner side face facing the inner side face of the other lug part on said friction pad, each said lug part being engageable with the stepped part of said support for causing the pair of friction pads to be supported by the support in the axial direction of the disc;
  means for supporting said pair of friction pads;
  means for pushing said supporting means for the pair of friction pads for engaging said friction pads with the opposite sides of said disc; and
  a pad clip located at each of the opposite ends of said friction pads spaced apart in the circumferential direction of said disc for elastically pushing the friction pads against said support, said pad clip including a first portion arranged to contact the support, a second portion spaced from and disposed angularly relative to said first portion and arranged to contact the lug part, and a hooked portion extending angularly from said second portion and arranged to contact the inner side face of the lug part for restricting the movement of the friction pad on the braking face of said disc during brake application.

2. A disc brake according to claim 1, wherein the support includes a protrusion spaced outwardly from the stepped part in the radial direction of the disc with respect to the stepped portion of the support, with the protrusion being arranged to contact the first portion of the pad clip.

3. A disc brake according to claim 2, wherein the pad clip has an arcuate projecting part located between said first portion and second portion extending outwardly with respect to the adjacent end of said lug and being arranged to engage with a recess provided by the stepped part in the support to restrict the movement of the pad clip and to push the friction pad in the circumferential direction of the disc.

* * * * *